Figure 1:
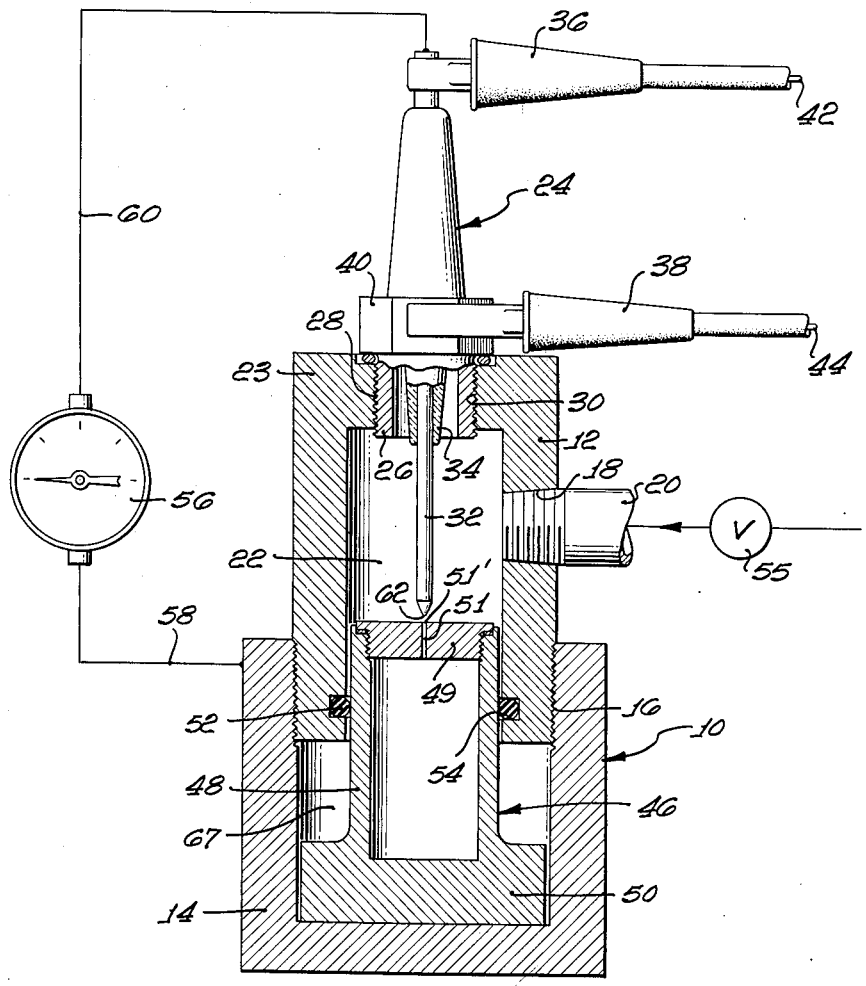

May 8, 1962   C. K. STEDMAN   3,033,972
PRESSURE WELDING APPARATUS AND METHOD
Filed Oct. 6, 1959

INVENTOR.
CECIL K. STEDMAN
BY Philip Subkow
   Max Geldin
   ATTORNEYS.

United States Patent Office 3,033,972
Patented May 8, 1962

3,033,972
PRESSURE WELDING APPARATUS AND METHOD
Cecil K. Stedman, Enumclaw, Wash., assignor to Statham Instruments, Inc., Los Angeles, Calif., a corporation of California
Filed Oct. 6, 1959, Ser. No. 844,776
2 Claims. (Cl. 219—74)

This invention relates to enclosing a gas under pressure within a container or instrument, and is particularly concerned with welding shut an aperture in a container or in an instrument case after a gas under pressure has been introduced via said aperture into said container or case, without loss of pressure therefrom.

The problem often presents itself of introducing a gas under pressure in a container, and welding the gas inlet shut without reduction of gas pressure in the container as result of leakage during the welding operation. Such problem is frequently encountered in the field of instrumentation, e.g. the transducer art, where it is desired to maintain the interior of the instrument under a preselected pressure.

It is an object of the invention to provide an apparatus and method for welding a container or instrument case, the interior of which is under gas pressure.

Another object is the provision of an apparatus and method for readily sealing or welding an inlet in a container or instrument case while a gas which has been introduced under preselected pressure into said container or case via said inlet, is maintained under said preselected pressure during and after welding, with no significant reduction of gas pressure.

The invention is based on the principle that if the exterior and the interior of an instrument or container are maintained at the same preselected pressure during the welding of the gas inlet to the interior of such container or instrument, the gas pressure within the container is not reduced during such welding operation and the internal pressure is maintained at a constant preselected level during and following welding. This is achieved according to the invention by provision of an apparatus comprising a closed electrically conductive housing which is designed to be opened and to receive in the interior thereof the container or instrument to be pressure welded. An electrode is mounted at one end of the housing and extends into the interior of the housing in alignment with the hole or aperture in the container or instrument, which hole is to be welded shut. Means are provided to adjust the axial position of the electrode within the housing and with respect to the hole to be welded. A fluid pressure inlet is provided in the housing. The electrode is insulated from the housing of the apparatus, and a welding terminal is electrically connected to the electrode and another welding terminal is electrically connected to the housing of the apparatus. When the weld is made, the electric circuit is completed through the electrode, the case of the container or instrument being pressure welded, the housing of the apparatus, and the welding terminals.

In carrying out the process of pressure welding according ot the invention, employing the apparatus thereof, the housing of the apparatus is opened, e.g. by providing removable top and bottom housing portions, and the container or instrument to be pressure welded is placed therein. Gas under a preselected pressure is introduced through the gas inlet of the housing into the interior thereof. The gas in such housing is introduced via a passage provided in the upper portion of the container or instrument case into the interior thereof to place said interior under the desired preselected pressure. While said pressure is maintained in the housing of the apparatus and in the interior of the container or instrument positioned within said housing, the tip of the welding electrode is placed closely adjacent the outer end of the passage to be welded in the container, and a welding arc is struck between the electrode and the metal adjacent the end of said passage, welding the passage shut and trapping the gas in said container at the preselected pressure without loss of pressure during the welding operation.

Figure 2:
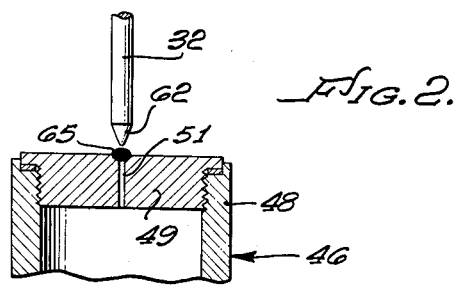

The method and apparatus of the invention will be more clearly understood from the description below of a preferred embodiment, taken in connection with the accompanying drawing wherein:

FIG. 1 is a cross section of a pressure welding apparatus according to the invention, and FIG. 2 shows a detail of the device after a weld has been made.

Referring to the drawing, numeral 10 represents the housing of the pressure welding apparatus, said housing being electrically conductive and having a top portion 12 and a bottom portion 14, said bottom portion having an internal diameter substantially equal to the external diameter of the top portion 12. The upper end of the bottom portion 14 is threadably engaged at 16 onto the lower end of the upper portion 12, so that the relative axial positions of said top and bottom portions are adjustable by rotation of the bottom portion with respect to the top portion. A threaded inlet 18 is provided in the side of the upper housing portion 12 for receiving a gas pressure fitting 20 for introduction of pressurized gas into the interior 22 of the upper housing portion.

Mounted centrally in the top 23 of the upper housing portion 12 is a conductive plug 24 having a lower body portion 26 which is threadably mounted at 28 in an aperture 30 formed in top 23. Carried within the plug is an elongated arc welding electrode 32, e.g., a thoriated tungsten electrode, which extends axially into the interior 22 of housing portion 12. The electrode 32 is insulated from the body of the plug 24 by insulation 34. A terminal 36 is electrically connected to the upper end of electrode 32 projecting from the top of the plug 24, and a second terminal 38 is electrically connected to a conductive flange 40 on the plug 24. A welding lead 42 is connected to terminal 36, and a ground lead 44 is connected to terminal 38.

In operation of the device for carrying out my welding procedure, the bottom housing portion 14 is detached from upper housing portion 12, and an instrument to be internally pressurized, represented by numeral 46 and comprising an outer case 48 and a cover 49 having a central passage 51 therein, is placed in the bottom housing portion 14. It will be understood that instead of pressurizing an instrument, I can apply the principles of the invention for welding shut any container while maintaining a preselected gas pressure therein. The case 48 has a flanged bottom portion 50 which rests on the bottom of housing portion 14, said flange 50 having a diameter slightly smaller than the internal diameter of the bottom portion 14 to prevent any significant lateral movement of the case 48 in housing 10.

The bottom housing portion 14 is then threaded onto the lower end of the upper housing portion 12, as shown in FIG. 1. A pressure seal 52 is provided in a recess 54 in the lower internal surface of the upper housing portion 12 for tightly engaging the external surface of the case 48. It will be seen that the electrode 32 is in axial alignment with the passage 51 which is to be welded shut. An ohmmeter 56 is connected via leads 58 and 60 to the lower housing portion 14 and to the upper end of electrode 32. The lower housing portion 14 is tightened sufficiently to cause the tip 62 of electrode 32 to closely approach the outer end of the passage 51. When the ohmmeter 56 indicates electrical contact between electrode 32 and the top 49 of the conductive instrument case 48, the bottom housing portion 14 is backed off from the upper housing portion 12 a very small amount, to give a clearance, e.g. of .020″, between the tip 62 of the electrode and the tip 51′ of the passage 51 to be sealed. Gas under a preselected pressure is then introduced via valve 55 and the fitting 20 into the interior 22 of upper housing portion 12, the gas passing via passage 51 into the interior of case 48 to be pressurized.

The ohmmeter 56 is then disconnected, and welding current is then applied across terminals 36 and 38, striking a welding arc between the tip 62 of the electrode and the metal around the tip 51′ of the passage 51 to be sealed. For example, a 220 volt 60 cycle A.C. potential plus a superimposed high frequency is applied between tips 62 and 51′ for a period of one second. At the end of this time a weld 65 is formed at the tip 51′ of passage 51, sealing off passage 51 and the interior of the instrument case 48. The welding circuit is completed from terminal 36, through electrode 32, case 48, housing portions 14 and 12, plug 24, flange 40, and terminal 38.

It will be seen that during the welding operation, the gas pressure within the interior of case 48 is maintained at the same preselected gas pressure as the interior 22 of the upper housing portion 12. Thus, at the completion of the formation of weld 65, sealing the interior of instrument 46, the gas pressure within the instrument is the same as that within housing portion 12. It will be noted that the seal 52 prevents leakage of pressurized gas from the interior of the upper housing portion 12 into the space 67 below the seal in the lower housing portion 14, thus maintaining the desired pressure in space 22 and the interior of the instrument 46. Also, seal 52 causes the pressure of the gas in space 22 to be exerted against the top 49 of the case 48, maintaining the flange 50 of case 48 in positive engagement with the bottom of the lower housing portion 14.

After the weld 65 has been formed, the interior 22 of housing portion 12 is vented. The lower housing portion 14 is threaded off the upper housing portion 12, and the sealed and pressurized instrument 46 is removed from bottom portion 14.

While I have described a particular embodiment of my invention for the purpose of illustration, it should be understood that various modifications and adaptations thereof may be made within the spirit of the invention as set forth in the appended claims.

I claim:

1. Pressure welding apparatus which comprises a conductive pressure housing including a bottom portion and a top portion threadably engaging the bottom portion for relative axial movement therebetween, means for maintaining in position in the bottom of said housing a case having a centrally positioned aperture to be welded shut, said aperture positioned in the upper end of said case, means sealing the upper interior portion of said housing from the space between the exterior of said case and the lower interior wall of said housing, a pressure inlet to the upper portion of said housing, a welding electrode assembly mounted in the upper end of said housing and including a conductive plug threaded on the end of said housing, an arc welding electrode mounted centrally in said plug and extending axially into the interior of the upper portion of said housing in alignment with said aperture, said electrode being insulated from said plug, said electrode being axially adjustable by relative axial movement of said top and bottom portions of said housing, means to strike an arc between said electrode and the peripheral wall of said case around said aperture at the gas pressure in said housing, a first terminal electrically connected to said electrode and a second terminal eletrically connected to said conductive plug.

2. A process for pressure welding which comprises introducing a gas under a preselected pressure into an enclosed zone, passing said gas under said preselected pressure from said zone into a closed metal case via a passage therein communicating with said zone and the interior of said case, passing an arc welding electrode into said zone in pressure sealed relation therewith and in alignment with said passage, placing the tip of said electrode into electrical contact with the metal of said case at said passage, withdrawing the tip of said electrode from said passage to provide a small clearance therebetween, passing welding current through said electrode and striking an arc between the tip of said electrode and the metal around said passage, welding together the metal of said case around said passage to weld the entrance to said passage shut and maintaining said zone and the interior of said case at substantially the same preselected pressure during said welding.

References Cited in the file of this patent

UNITED STATES PATENTS

| | | |
|---|---|---|
| 1,504,088 | Bransten | Aug. 5, 1924 |
| 1,728,171 | Badger | Sept. 17, 1929 |
| 1,970,715 | Tate | Aug. 21, 1934 |
| 2,101,156 | Payne | Dec. 7, 1937 |
| 2,899,538 | Hughes | Aug. 11, 1959 |